(12) United States Patent
Saitou

(10) Patent No.: US 10,371,211 B2
(45) Date of Patent: Aug. 6, 2019

(54) BEARING STRUCTURE

(71) Applicant: FANUC CORPORATION, Yamanashi (JP)

(72) Inventor: Takeshi Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/178,826

(22) Filed: Nov. 2, 2018

(65) Prior Publication Data

US 2019/0178293 A1  Jun. 13, 2019

(30) Foreign Application Priority Data

Dec. 12, 2017 (JP) ................. 2017-237550

(51) Int. Cl.
*F16C 43/04* (2006.01)
*F16C 35/06* (2006.01)
*F16C 33/58* (2006.01)
*F16C 35/04* (2006.01)

(52) U.S. Cl.
CPC .......... *F16C 35/062* (2013.01); *F16C 33/586* (2013.01); *F16C 35/042* (2013.01); *F16C 2237/00* (2013.01)

(58) Field of Classification Search
CPC ...... F16C 19/18; F16C 19/181; F16C 19/182; F16C 19/183; F16C 19/184; F16C 19/546; F16C 19/547; F16C 19/548; F16C 33/586; F16C 35/062; F16C 35/063; F16C 2237/00; Y10T 29/49698; Y10T 29/49721
See application file for complete search history.

(56) References Cited

U.S. PATENT DOCUMENTS 2,627,120 A * 2/1953 Hotchkiss .............. G01B 5/146
29/407.01

FOREIGN PATENT DOCUMENTS

JP    2001050290 A  *  2/2001 ........... F16C 35/077
JP    2006-105370 A    4/2006

* cited by examiner

*Primary Examiner* — Phillip A Johnson
(74) *Attorney, Agent, or Firm* — Studebaker & Brackett PC

(57) ABSTRACT

A bearing structure comprises: two bearings arranged in an axis direction and having outer rings and inner rings; and a spacer interposed between the bearings. The spacer comprises: a ring-like outer ring spacer interposed between the outer rings of the two bearings arranged in the axis direction, and having an insertion hole penetrating the outer ring spacer in a radial direction RD and into which a jig is to be inserted; and a ring-like inner ring spacer interposed between the inner rings of the two bearings arranged in the axis direction, and having an engagement part to make engagement with the jig inserted into the insertion hole. The one bearing is capable of being pulled out together with the spacer from a rotary shaft supported by the inner rings by pulling the jig in the axis direction inserted into the insertion hole and engaged with the engagement part.

2 Claims, 10 Drawing Sheets

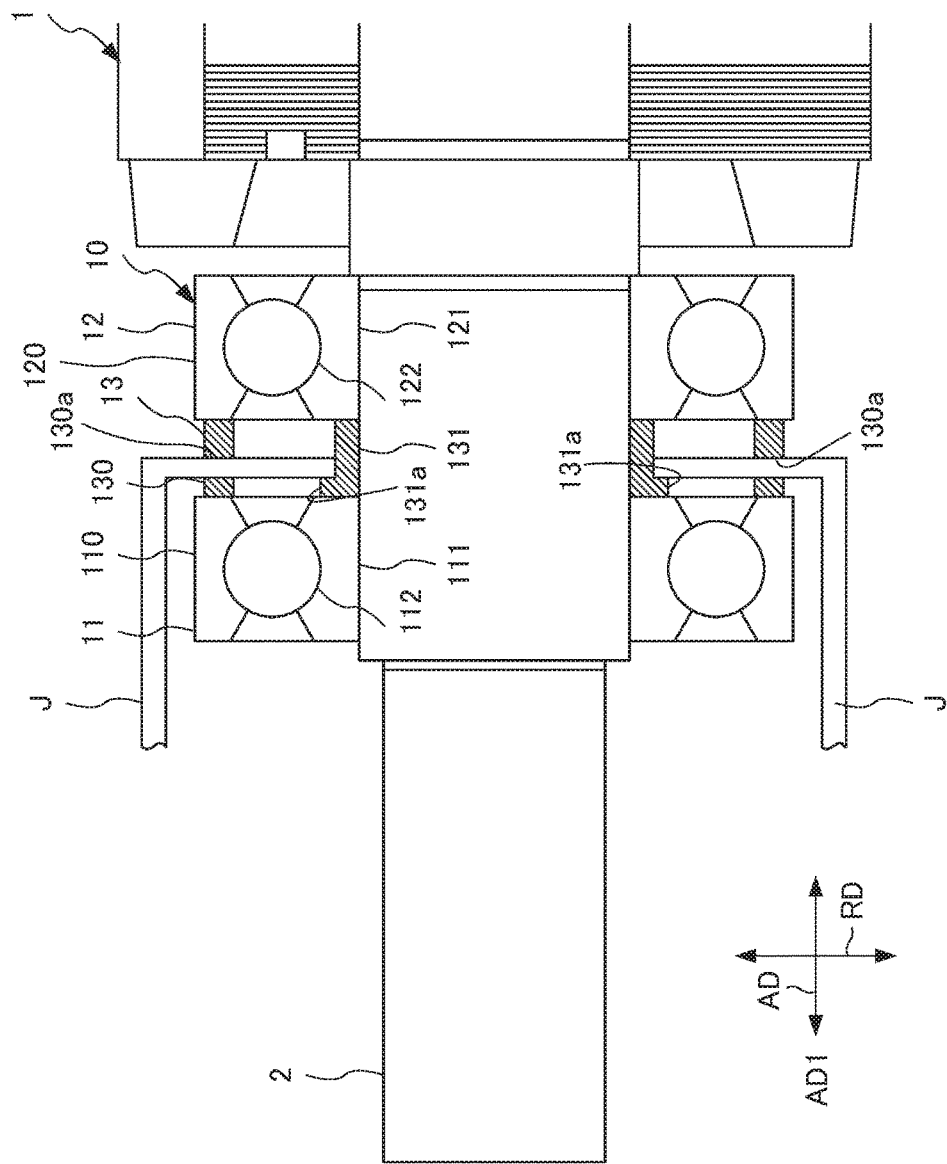

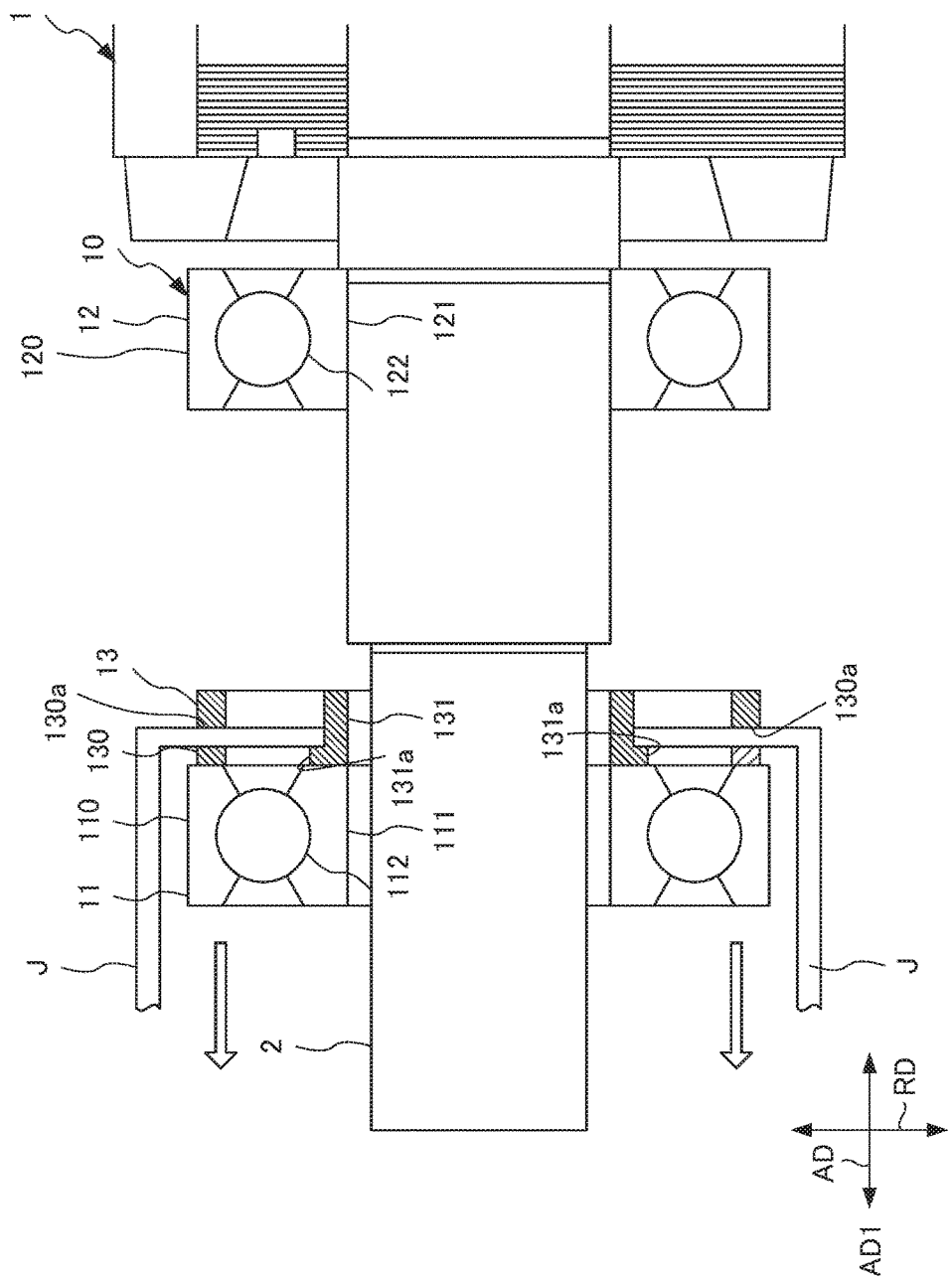

FIG. 9
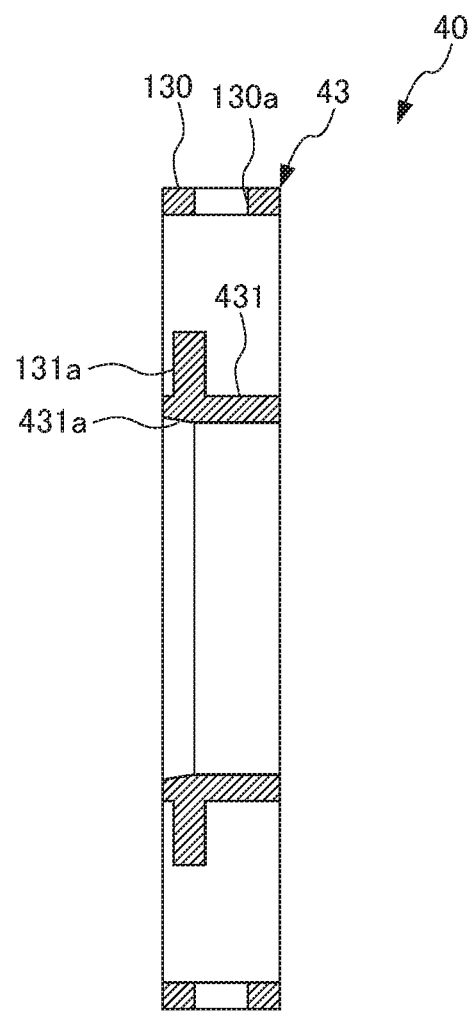
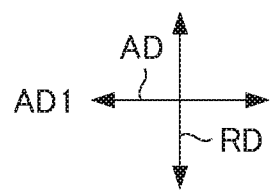

BEARING STRUCTURE

This application is based on and claims the benefit of priority from Japanese Patent Application No. 2017-237550, filed on 12 Dec. 2017, the content of which is incorporated herein by reference.

BACKGROUND OF THE INVENTION

Field of the Invention

The present invention relates to a bearing structure with a spacer interposed between two bearings arranged in an axis direction.

Related Art

In a bearing structure conventionally known, two bearings are arranged adjacent to each other in an axis direction to handle high load applied to a rotary shaft (see patent document 1, for example). In such a bearing structure, for exchange of a bearing, the two bearings arranged adjacent to each other should be detached from the rotary shaft by being pulled simultaneously.

Patent Document 1: Japanese Unexamined Patent Application, Publication No. 2006-105370

SUMMARY OF THE INVENTION

The bearing is fitted by interference fit to the rotary shaft and may be attached fixedly to the rotary shaft with years of use. This has made it impossible to detach the two bearings arranged adjacent to each other simultaneously.

The present invention has been made in view of the foregoing problem, and is intended to provide a bearing structure allowing multiple bearings to be easily detached one by one from a rotary shaft.

(1) The present invention is intended for a bearing structure (bearing structure 10, 20, 30, 40 described later, for example) comprising: two bearings (bearings 11, 12 described later, for example) arranged in an axis direction (axis direction AD described later, for example) and having respective outer rings (outer rings 110, 120 described later, for example) and respective inner rings (inner rings 111, 121 described later, for example) to rotate relative to the outer rings; and a spacer (spacer 13, 23, 33, 43 described later, for example) interposed between the bearings. The spacer comprises: a ring-like outer ring spacer (outer ring spacer 130, 330 described later, for example) interposed between the respective outer rings of the two bearings arranged in the axis direction, and having an insertion hole (insertion hole 130a, 330a, 330b described later, for example) penetrating the outer ring spacer in a radial direction (radial direction. RD described later, for example) and into which a jig (jig J, J1 described later, for example) is to be inserted; and a ring-like inner ring spacer (inner ring spacer 131, 231, 331, 431 described later, for example) interposed between the respective inner rings of the two bearings arranged in the axis direction, and having an engagement part (projection 131a and recess 231a, 331a described later, for example) to make engagement with the jig inserted into the insertion hole. One bearing of the two bearings is capable of being pulled out together with the spacer from a rotary shaft (rotary shaft 2 described later, for example) supported by the inner rings by pulling the jig in the axis direction inserted into the insertion hole and engaged with the engagement part.

(2) In the bearing structure described in (1), the inner ring spacer may have a tapered part (tapered part 431a described later, for example) at which the inner ring spacer increases in inner diameter toward an end portion of the inner ring spacer in the axis direction (first axis direction AD1 described later, for example) pointing to the one bearing (bearing 11 described later, for example).

The present invention is capable of providing a bearing structure allowing multiple bearings to be easily detached one by one from a rotary shaft.

BRIEF DESCRIPTION OF THE DRAWINGS

FIG. 3A is a schematic view showing the rotor in a state in which a jig is placed at the spacer;

FIG. 3B is a schematic view showing the rotor in a state in which a bearing has been detached;

FIG. 9 a sectional view showing the spacer according to the fourth embodiment.

DETAILED DESCRIPTION OF THE INVENTION

Figure 1:
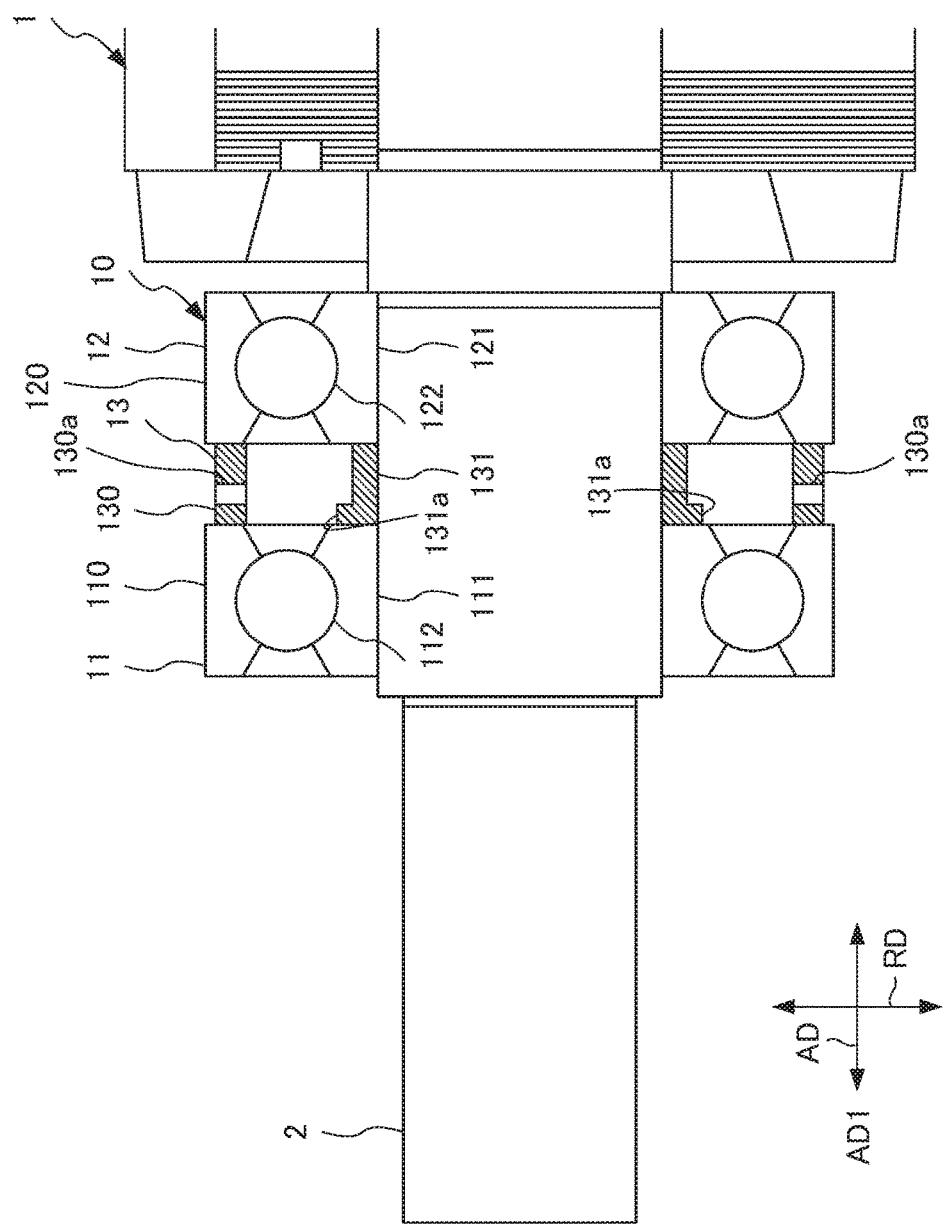
FIG. 1 is a schematic view showing a rotor with a bearing structure according to a first embodiment of the present invention.

Bearing structures according to embodiments of the present invention will be described below by referring to the drawings. Regarding a second embodiment and subsequent embodiments, a component common to that in a first embodiment will be given the same sign, and a component corresponding to that in the first embodiment will be given a sign by following the same regularity (with the same last digit or same last two digits, for example). Where appropriate, description of such components will be omitted. Further, descriptions of operations and effects of the second embodiment and those of the subsequent embodiments common to those of the first embodiment will be omitted, where appropriate.

First Embodiment

Figure 2:
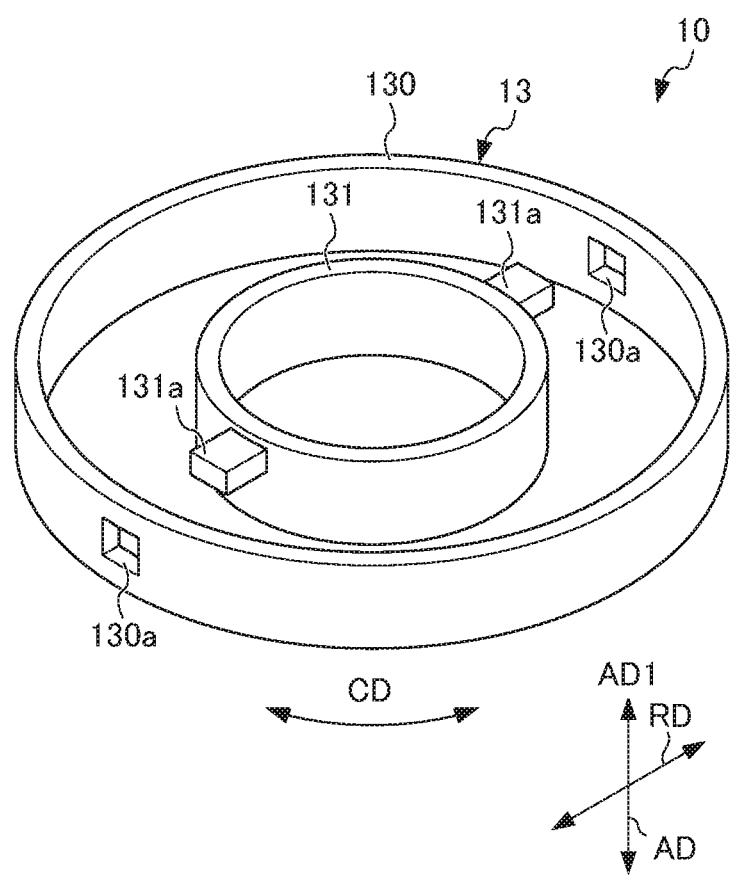
FIG. 2 is a perspective view showing a spacer provided in the bearing structure.

A bearing structure 10 according to a first embodiment will be described first using FIGS. 1 and 2. FIG. 1 is a schematic view showing a rotor 1 with the bearing structure 10. FIG. 2 is a perspective view showing a spacer 13 provided in the bearing structure 10.

The rotor 1 works together with a stator, etc. to form a motor. As shown in FIG. 1, the rotor 1 includes a rotary shaft 2 and the bearing structure 10. The bearing structure 10 includes two bearings 11 and 12 arranged in an axis direction AD, and a spacer 13. The configuration of the bearing structure 10 is such that the spacer 13 is interposed between the two bearings 11 and 12 fitted by interference fit to the rotary shaft 2.

The one bearing 11 includes an outer ring 110, an inner ring 111, and multiple balls 112. The outer ring 110 is fixed to a housing (not shown). The inner ring 111 is fitted by interference fit to the rotary shaft 2 and rotates relative to the outer ring 110. The multiple balls 112 are arranged in a ring-like pattern perpendicular to the axis direction AD and interposed between the outer ring 110 and the inner ring 111, thereby allowing the inner ring 111 to rotate relative to the outer ring 110. The bearing 11 having the foregoing configuration supports the rotary shaft 2 on the housing and allows the rotary shaft 2 to rotate relative to the housing.

The other bearing 12 has a configuration basically the same as that of the bearing 11. The bearing 12 includes an outer ring 120, an inner ring 121, and multiple balls 122. The outer ring 120 is fixed to the housing (not shown). The inner ring 121 is fitted by interference fit to the rotary shaft 2 and rotates relative to the outer ring 120. The multiple balls 122 are arranged in a ring-like pattern perpendicular to the axis direction AD and interposed between the outer ring 120 and the inner ring 121, thereby allowing the inner ring 121 to rotate relative to the outer ring 120. The bearing 12 having the foregoing configuration supports the rotary shaft 2 on the housing and allows the rotary shaft 2 to rotate relative to the housing. The axis direction AD includes a direction starting from the other bearing 12 and pointing to the one bearing 11, and this direction will also be called a "first axis direction AD1."

As shown in FIGS. 1 and 2, the spacer 13 includes an outer ring spacer 130 and an inner ring spacer 131. The outer ring spacer 130 has a ring-like shape and is interposed between the respective outer rings 110 and 120 of the two bearings 11 and 12 arranged in the axis direction AD. The outer ring spacer 130 has multiple insertion holes 130a formed at equally spaced positions in a circumferential direction CD and penetrating the outer ring spacer 130 in a radial direction RD. The insertion holes 130a are holes into which a jig J such as a gear puller is to be inserted (see FIGS. 3A and 3B). In this embodiment, two insertion holes 130a are arranged at an angular interval of 180 degrees.

The inner ring spacer 131 has a ring-like shape and is interposed between the respective inner rings 111 and 121 of the two bearings 11 and 12 arranged in the axis direction AD. The inner ring spacer 131 has multiple projections (engagement parts) 131a formed at equally spaced positions in the circumferential direction CD and corresponding to the positions of the insertion holes 130a. The projections 131a are to make engagement with the jig J inserted into the insertion holes 130a. In this embodiment, two projections (engagement parts) 131a are arranged at an angular interval of 180 degrees.

Detachment of the bearing 11 will be described next using FIGS. 3A and 3B. FIG. 3A is a schematic view showing the rotor 1 in a state in which the jig J is placed at the spacer 13. FIG. 3B is a schematic view showing the rotor 1 in a state in which the bearing 11 has been detached.

As shown in FIG. 3A, to detach the one bearing 11 from the rotary shaft 2, the jig J is inserted into each of the multiple insertion holes 130a at the outer ring spacer 130. Then, the jig J is engaged with each of the multiple projections 131a at the inner ring spacer 131.

Next, the jig J inserted into the insertion holes 130a and engaged with the projections 131a is pulled in the first axis direction AD1 of the axis direction AD. By doing so, as shown in FIG. 3B, the one bearing 11 and the spacer 13 are together pulled out from the rotary shaft 2. The absence of the one bearing 11 allows the other bearing 12 to be pulled out easily.

The bearing structure 10 of this embodiment achieves the following effect, for example. The bearing structure 10 of this embodiment includes: the two bearings 11 and 12 arranged in the axis direction AD and having the respective outer rings 110 and 120, and the respective inner rings 111 and 121 to rotate relative to the outer rings 110 and 120; and the spacer 13 interposed between the bearings 11 and 12. The spacer 13 includes: the ring-like outer ring spacer 130 interposed between the respective outer rings 110 and 120 of the two bearings 11 and 12 arranged in the axis direction AD, and having the insertion holes 130a penetrating the outer ring spacer 130 in the radial direction RD and into which the jig J is to be inserted; and the ring-like inner ring spacer 131 interposed between the respective inner rings 111 and 121 of the two bearings 11 and 12 arranged in the axis direction AD, and having the projections 131a as the engagement parts to make engagement with the jig J inserted into the insertion holes 130a. One of the bearing 11 of the two bearings 11 and 12 is capable of being pulled out together with the spacer 13 from the rotary shaft 2 supported by the inner rings 111 and 121 by pulling the jig J in the axis direction AD inserted into the insertion holes 130a and engaged with the projections 131a.

As a result, in the bearing structure 10 of this embodiment, the multiple bearings 11 and 12 can be detached easily one by one from the rotary shaft 2.

Second Embodiment

Figure 4:
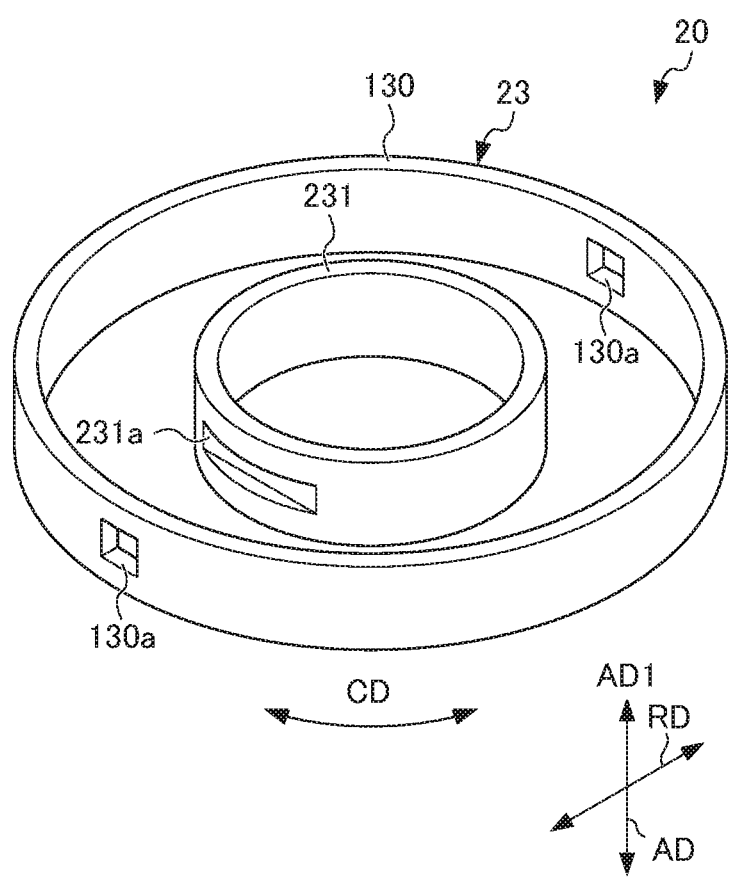
FIG. 4 is a perspective view showing a spacer provided in a bearing structure according to a second embodiment of the present invention.

A spacer 23 provided in a bearing structure 20 according to a second embodiment will be described next using FIG. 4. FIG. 4 is a perspective view showing the spacer 23 provided in the bearing structure 20. The bearing structure 20 according to this embodiment differs from the bearing structure 10 of the first embodiment in that the bearing structure 20 includes the spacer 23 instead of the spacer 13.

As shown in FIG. 4, the spacer 23 includes the outer ring spacer 130 and an inner ring spacer 231. The inner ring spacer 231 has a ring-like shape and is interposed between the respective inner rings 111 and 121 of the two bearings 11 and 12 arranged in the axis direction AD (see FIG. 1). The inner ring spacer 231 has multiple recesses (engagement parts) 231a formed at equally spaced positions in the circumferential direction CD and corresponding to the positions of the insertion holes 130a. The recesses 231a are to make engagement with the jig J inserted into the insertion holes 130a. In this embodiment, two recesses (engagement parts) 231a are arranged at an angular interval of 180 degrees.

Third Embodiment

Figure 5:
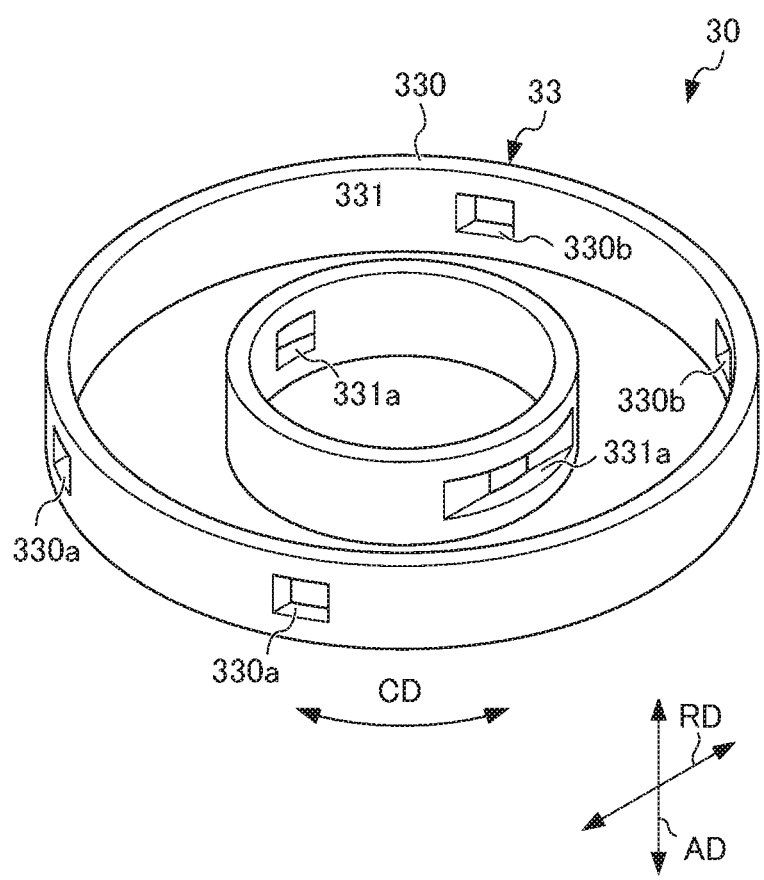
FIG. 5 is a perspective view showing a spacer provided in a bearing structure according to a third embodiment of the present invention.

A spacer 33 provided in a bearing structure 30 according to a third embodiment will be described next using FIG. 5. FIG. 5 is a perspective view showing the spacer 33 provided in the bearing structure 30. The bearing structure 30 according to this embodiment differs from the bearing structure 10 of the first embodiment in that the bearing structure 30 includes the spacer 33 instead of the spacer 13.

As shown in FIG. 5, the spacer 33 includes an outer ring spacer 330 and an inner ring spacer 331. The outer ring spacer 330 has a ring-like shape and is interposed between the respective outer rings 110 and 120 of the two bearings 11 and 12 arranged in the axis direction AD (see FIG. 1). The outer ring spacer 330 has two pairs each including an insertion hole 330a and an insertion hole 330b formed at positions spaced by a predetermined interval in the circumferential direction CD and penetrating the outer ring spacer 330 in the radial direction RD. The insertion holes 330a and 330b are holes into which a jig J1 is to be inserted (see FIGS. 6 and 7). The inner ring spacer 331 has two recesses (engagement parts) 331a formed at equally spaced positions in the circumferential direction CD and corresponding to the positions of the insertion holes 330a and the insertion holes 330b. Each of the recesses 331a is to make engagement with the jig J1 inserted into the insertion holes 330a and 330b in one pair. The engagement part is not limited to the recess but it may also be a projection.

Figure 6:
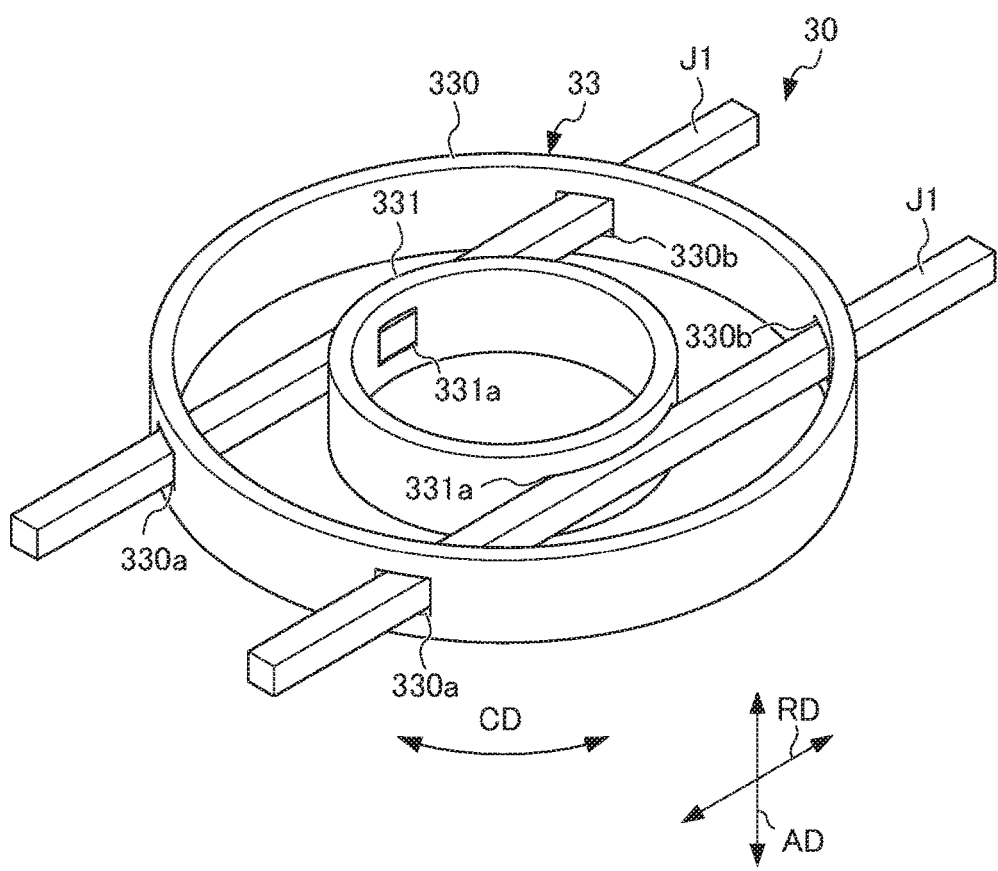
FIG. 6 is a perspective view showing the spacer according to the third embodiment in a state in which jigs are placed at the spacer.
Figure 7:
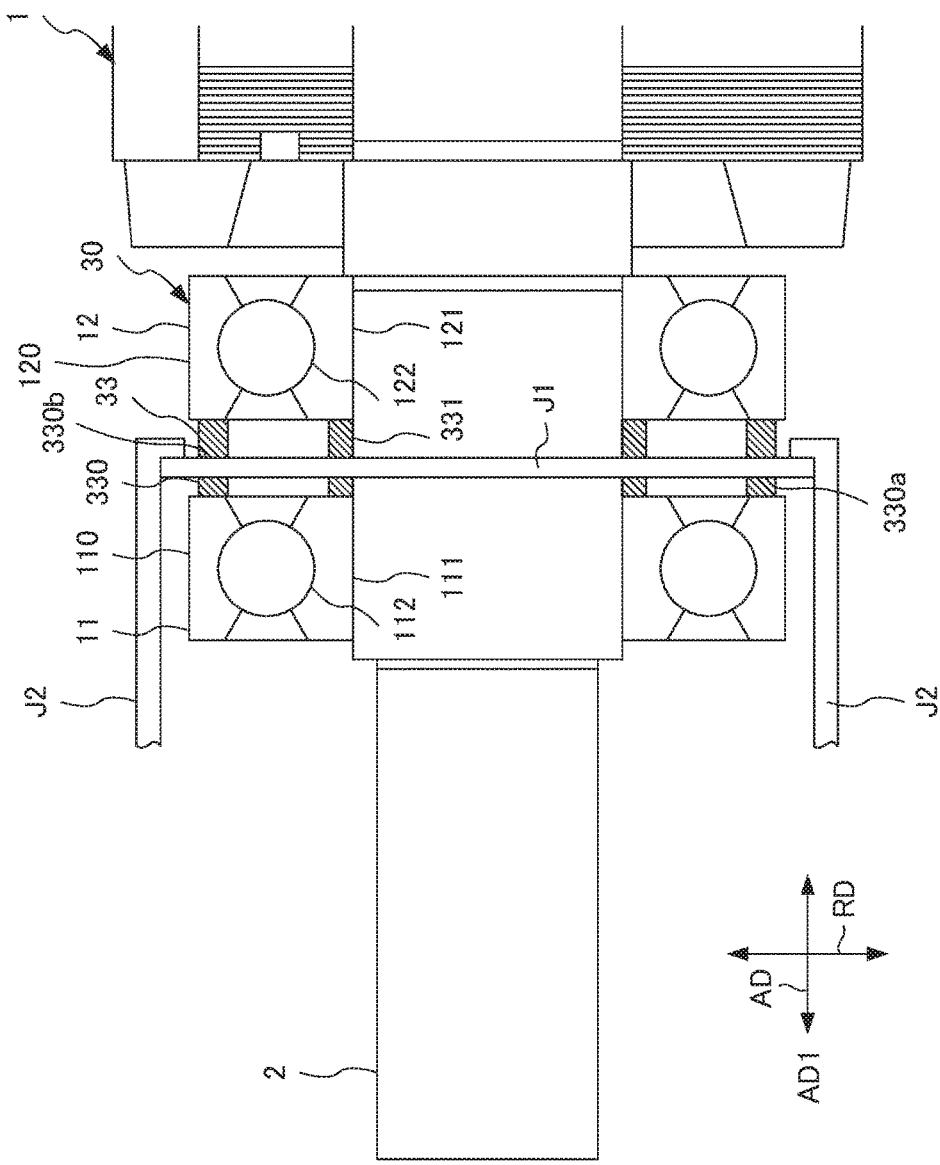
FIG. 7 is a schematic view showing the rotor in a state in which the jigs are placed at the spacer according to the third embodiment.

Detachment of the bearing 11 will be described next using FIGS. 6 and 7. FIG. 6 is a perspective view showing the spacer 33 in a state in which the jigs J1 are placed at the spacer 33. FIG. 7 is a schematic view showing the rotor 1 in a state in which the jigs J1 are placed at the spacer 33.

As shown in FIGS. 6 and 7, to detach the bearing 11 from the rotary shaft 2, the jigs J1 are inserted into all the insertion holes 330a and the insertion holes 330b in two pairs at the outer ring spacer 330. Then, the jigs J1 are engaged with corresponding ones of the two recesses 331a at the inner ring spacer 331.

Next, the jigs J1 inserted into the insertion holes 330a and the insertion holes 330b and engaged with the recesses 331a are engaged with different jig J2 such as a gear puller, and pulled in the axis direction AD. By doing so, the bearing 11 and the spacer 33 are together pulled out from the rotary shaft 2.

Fourth Embodiment

Figure 8:
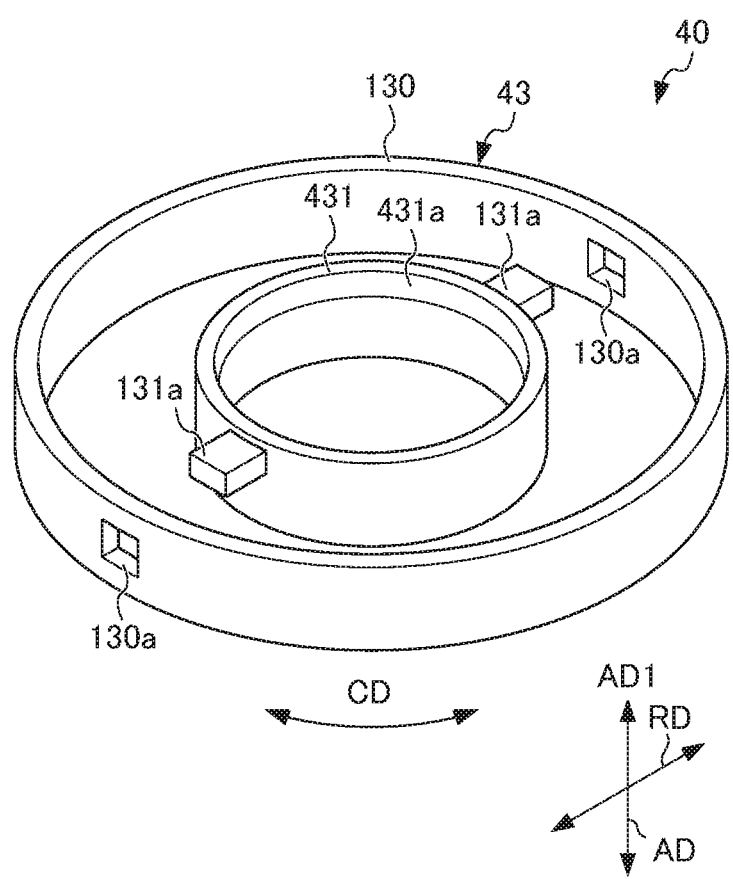
FIG. 8 is a perspective view showing a spacer provided in a bearing structure according to a fourth embodiment of the present invention.

A spacer 43 provided in a bearing structure 40 according to a fourth embodiment will be described next using FIGS. 8 and 9. FIG. 8 is a perspective view showing the spacer 43 provided in the bearing structure 40. FIG. 9 is a sectional view showing the spacer 43. The bearing structure 40 according to this embodiment differs from the bearing structure 10 of the first embodiment in that the bearing structure 40 includes the spacer 43 instead of the spacer 13.

As shown in FIGS. 8 and 9, the spacer 43 includes the outer ring spacer 130 and an inner ring spacer 431. The inner ring spacer 431 has a ring-like shape and is interposed between the respective inner rings 111 and 121 of the two bearings 11 and 12 arranged in the axis direction AD (see FIG. 1). The inner ring spacer 431 has multiple (in this embodiment, two) projections 131a. The inner ring spacer 431 has a tapered part 431a at which the inner ring spacer 431 increases in inner diameter toward an end portion of the inner ring spacer 431 in the axis direction AD (first axis direction AD1) pointing to the one bearing 11.

The bearing structure 40 of this embodiment achieves the following effect, for example. The inner ring spacer 431 of the bearing structure 40 of this embodiment has the tapered part 431a at which the inner ring spacer 431 increases in inner diameter toward an end portion or the inner ring spacer 431 in the axis direction AD (first axis direction AD1) pointing to the one bearing 11. Thus, when the jig J inserted into the insertion holes 130a and then engaged with the projections 131a is pulled in the first axis direction AD1 of the axis direction AD, the likelihood of tightening of the rotary shaft 2 due to deformation of the inner ring spacer 431 can be reduced. This makes it possible to alleviate the difficulty in pulling out the bearing 11 from the rotary shaft 2.

The present invention is not limited to each of the foregoing embodiments but various changes and modifications of the present invention can be devised. The components in each of the embodiments can be combined. The bearing structure may include three or more bearings, or two or more spacers. In the embodiments described above, the bearing structures 10, 20, 30, and 40 are applied to the rotary shaft 2 of the rotor 1. However, this is not the only example of the application. The bearing structures 10, 20, 30, and 40 are applicable to various types of rotary shafts such as a spindle of a machine tool and a rotary shaft of an electric injection molding machine.

EXPLANATION OF REFERENCE NUMERALS

1 Rotor
2 Rotary shaft
10, 20, 30, 40 Bearing structure
11, 12 Bearing
110, 120 Outer ring
111, 121 Inner ring
112, 122 Ball
13, 23, 33, 43 Spacer
130, 330 Outer ring spacer
130a, 330a, 330b Insertion hole
131, 231, 331, 431 Inner ring spacer
131a Projection (engagement part)
231a, 331a Recess (engagement part)
431a Tapered part
J, J1 Jig
CD Circumferential direction
RD Radial direction
AD Axis direction

What is claimed is:

1. A bearing structure comprising: two bearings arranged in an axis direction and having respective outer rings and respective inner rings to rotate relative to the outer rings; and a spacer interposed between the bearings, wherein
    the spacer comprises:
    a ring-like outer ring spacer interposed between the respective outer rings of the two bearings arranged in the axis direction, and having an insertion hole penetrating the outer ring spacer in a radial direction and into which a jig is to be inserted; and
    a ring-like inner ring spacer interposed between the respective inner rings of the two bearings arranged in the axis direction, and having an engagement part to make engagement with the jig inserted into the insertion hole, and
    one bearing of the two bearings is capable of being pulled out together with the spacer from a rotary shaft supported by the inner rings by pulling the jig in the axis direction (AD) inserted into the insertion hole and engaged with the engagement part.

2. The bearing structure according to claim 1, wherein the inner ring spacer has a tapered part at which the inner ring spacer increases in inner diameter toward an end portion of the inner ring spacer in the axis direction pointing to the one bearing.

* * * * *